US012637332B2

(12) United States Patent
Fukumori et al.

(10) Patent No.: US 12,637,332 B2
(45) Date of Patent: May 26, 2026

(54) WORK MACHINE

(71) Applicant: TADANO LTD., Kagawa (JP)

(72) Inventors: Yasuhiro Fukumori, Kagawa (JP); Naoto Kawabuchi, Kagawa (JP)

(73) Assignee: TADANO LTD., Kagawa (JP)

( * ) Notice: Subject to any disclaimer, the term of this patent is extended or adjusted under 35 U.S.C. 154(b) by 422 days.

(21) Appl. No.: 18/038,925

(22) PCT Filed: Nov. 18, 2021

(86) PCT No.: PCT/JP2021/042460
§ 371 (c)(1),
(2) Date: May 25, 2023

(87) PCT Pub. No.: WO2022/113882
PCT Pub. Date: Jun. 2, 2022

(65) Prior Publication Data
US 2024/0017972 A1 Jan. 18, 2024

(30) Foreign Application Priority Data
Nov. 26, 2020 (JP) ................................ 2020-196126

(51) Int. Cl.
*B66C 23/70* (2006.01)
*B66C 13/20* (2006.01)

(52) U.S. Cl.
CPC ............ *B66C 23/705* (2013.01); *B66C 13/20* (2013.01); *B66C 2700/065* (2013.01)

(58) Field of Classification Search
CPC ......... F15B 11/20; F15B 11/205; F15B 11/22; F15B 15/16; F15B 15/165;
(Continued)

(56) References Cited

U.S. PATENT DOCUMENTS 7,458,308 B2 * 12/2008 Badia .................... B66C 23/705 91/520
9,631,643 B2 * 4/2017 Hilzendegen ........... F15B 11/22
10,501,000 B2 * 12/2019 Itai .......................... F15B 11/20

FOREIGN PATENT DOCUMENTS

JP S56-007894 A 1/1981
JP S58-220089 A 12/1983
(Continued)

OTHER PUBLICATIONS

Feb. 1, 2022, International Search Report issued for related PCT Application No. PCT/JP2021/042460.
(Continued)

*Primary Examiner* — Michael Leslie
(74) *Attorney, Agent, or Firm* — Paratus Law Group, PLLC

(57) ABSTRACT

This work machine includes: a first hydraulic cylinder and a second hydraulic cylinder that telescope a telescopic boom on the basis of hydraulic oil supply and discharge, a switching valve that is disposed on a pressure relief circuit for connecting the first hydraulic cylinder and the second hydraulic cylinder to a tank, and a control unit that causes the switching valve to connect the first hydraulic cylinder to the tank and releases the pressure in the first hydraulic cylinder when contracting or extending the second hydraulic cylinder in a condition in which the first hydraulic cylinder is contracted.

8 Claims, 6 Drawing Sheets

(58) Field of Classification Search
CPC ............. F15B 2211/7057; B66C 13/20; B66C 23/705; B66C 2700/065
See application file for complete search history.

(56) References Cited

FOREIGN PATENT DOCUMENTS

| | | | |
|---|---|---|---|
| JP | H11-217191 | A | 8/1999 |
| JP | 3122400 | B2 * | 1/2001 |
| JP | 2004-149309 | A | 5/2004 |

OTHER PUBLICATIONS

Feb. 1, 2022, International Search Opinion issued for related PCT Application No. PCT/JP2021/042460.

* cited by examiner

WORK MACHINE

CROSS REFERENCE TO PRIOR APPLICATION

This application is a National Stage Patent Application of PCT International Patent Application No. PCT/JP2021/042460 (filed on Nov. 18, 2021) under 35 U.S.C. § 371, which claims priority to Japanese Patent Application No. 2020-196126 (filed on Nov. 26, 2020), which are all hereby incorporated by reference in their entirety.

TECHNICAL FIELD

The present invention relates to a work machine including a plurality of extension/contraction hydraulic cylinders that telescopes a multistage boom.

BACKGROUND ART

In the related art, there has been known a work machine (for example, a crane) including a plurality of extension/contraction hydraulic cylinders that telescopes a multistage boom. Patent Literature 1 discloses a telescopic boom-type high-place work vehicle provided with a limit switch that detects an amount of extension of an intermediate boom with respect to a proximal end boom, and configured to detect whether the intermediate boom is substantially fully contracted with respect to the proximal end boom.

However, in the crane, a state in which the boom is almost fully contracted, that is, a state in which the extension/contraction hydraulic cylinder is not completely fully contracted is not preferable. When the lifting load is hung in this state, the extension/contraction hydraulic cylinder receives a load originally to be received by the boom, and the extension/contraction hydraulic cylinder may be damaged. Therefore, in a crane including multistage booms, it is desired to completely fully contract the extension/contraction hydraulic cylinder.

CITATION LIST

Patent Literature

Patent Literature 1: JP 2004-149309 A

SUMMARY OF THE INVENTION

Problems to be Solved by the Invention

However, in a crane including a plurality of extension/contraction hydraulic cylinders and capable of changing the extension/contraction order of the extension/contraction hydraulic cylinders, a state has occurred in which a predetermined extension/contraction hydraulic cylinder that should have been fully contracted is not fully contracted. For example, in the process of reducing the boom, even in a state in which the predetermined extension/contraction hydraulic cylinder that should have been fully contracted is not completely fully contracted, it may be determined as the fully contracted state. This is because, when the boom length detector is used, the detected length of the boom has a certain range due to variation and hysteresis of the boom length detector.

In addition, for example, is the extension process of the boom, the hydraulic oil may leak to the extension/contraction hydraulic cylinder not to be operated through the spool gap of the solenoid valve that switches the extension/contraction hydraulic cylinder to be operated, and the extension/contraction hydraulic cylinder not to be operated may extend.

An object of the present invention is to provide a work machine including a plurality of extension/contraction hydraulic cylinders that telescopes multistage booms, the work machine being capable of fully contracting a predetermined extension/contraction hydraulic cylinder.

Solutions to Problems

An aspect of a work machine according to the present invention includes

- a first hydraulic cylinder and a second hydraulic cylinder that telescope a telescopic boom on a basis of hydraulic oil supply and discharge,
- a switching valve that is disposed on a pressure relief circuit for connecting the first hydraulic cylinder and the second hydraulic cylinder to a tank, and
- a control unit that causes the switching valve to connect the first hydraulic cylinder to the tank and releases a pressure in the first hydraulic cylinder when contracting or extending the second hydraulic cylinder in a condition in which the first hydraulic cylinder contracts.

Effects of the Invention

According to the present invention, in a work machine including a plurality of extension/contraction hydraulic cylinders that telescopes multistage booms, a predetermined extension/contraction hydraulic cylinder can be completely fully contracted.

DESCRIPTION OF EMBODIMENTS

Figure 1:
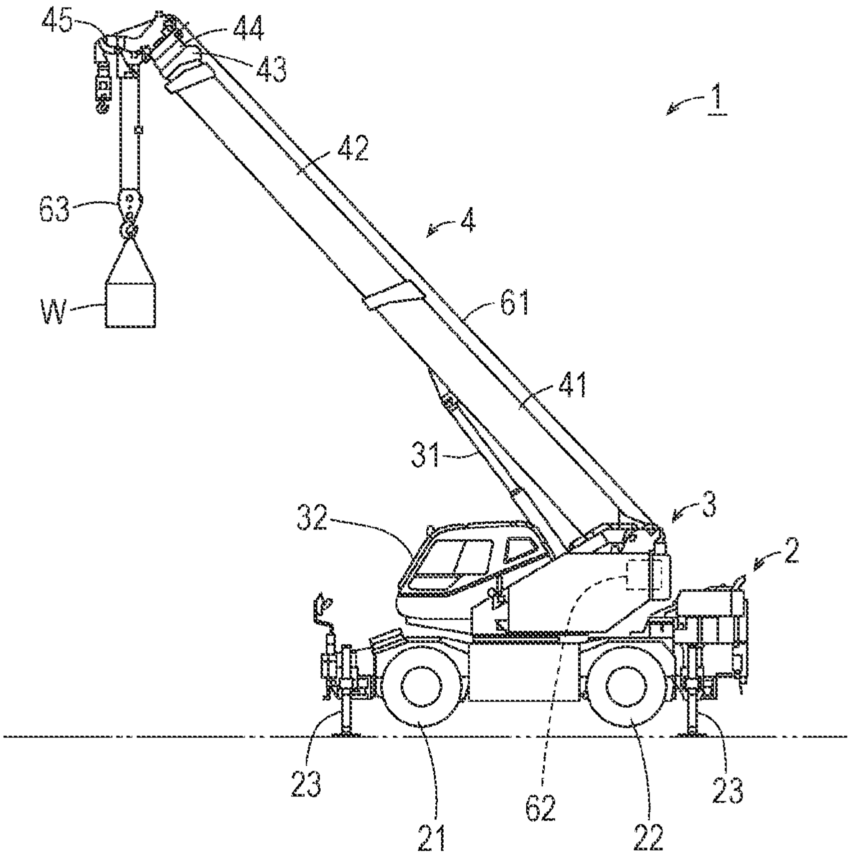
FIG. 1 is a side view illustrating an overall configuration of a crane according to an embodiment of the present invention.
Figure 2:
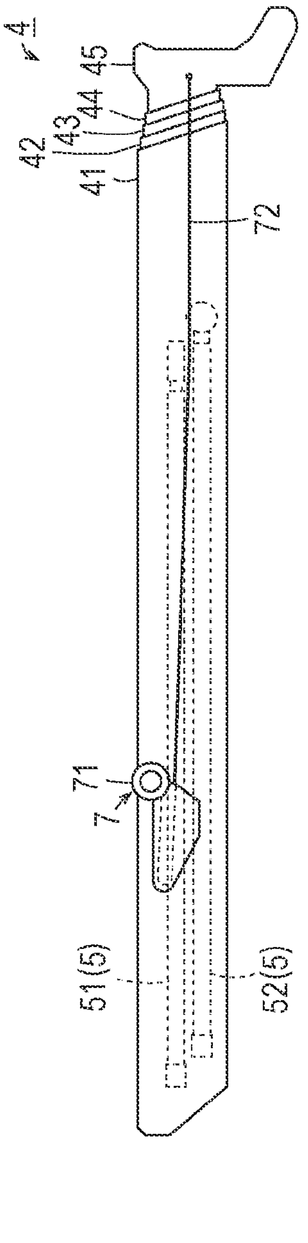
FIG. 2 is a schematic side view of the boom when the extension/contraction hydraulic cylinder is in a first state.
Figure 3:
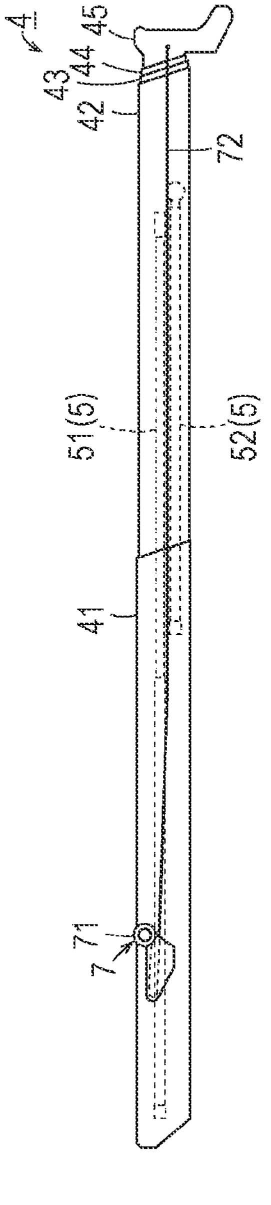
FIG. 3 is a schematic side view of the boom when the extension/contraction hydraulic cylinder is in a second state.
Figure 4:
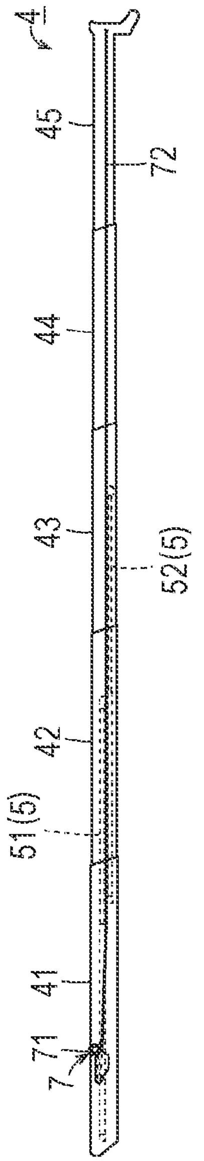
FIG. 4 is a schematic side view of the boom when the extension/contraction hydraulic cylinder is in a third state.
Figure 5:
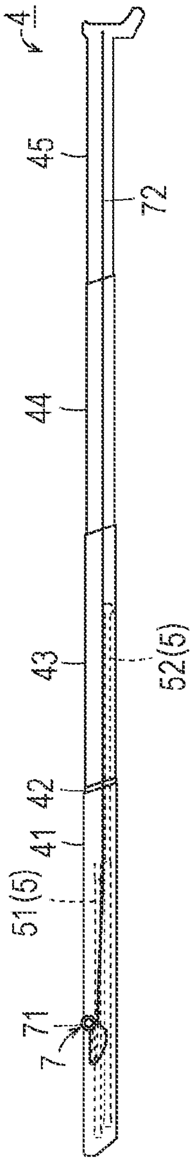
FIG. 5 is a schematic side view of the boom when the extension/contraction hydraulic cylinder is in a fourth state.

Hereinafter, a work machine according to an embodiment of the present invention will be described with reference to FIGS. 1 to 6. The work machine is not limited to a crane, and may be, for example, a high-place work vehicle including a telescopic boom. The work machine may be various work machines including a telescopic boom.

First, an outline of a crane 1 which is an example of a work machine according to the present embodiment will be described. The crane 1 includes a first extension/contraction hydraulic cylinder 51 and a second extension/contraction hydraulic cylinder 52 that telescope a telescopic boom 4 on the basis of hydraulic oil supply and discharge, an extension/contraction cylinder pressure relief solenoid valve 88 provided on a pressure relief circuit that connects the first extension/contraction hydraulic cylinder 51 and the second extension/contraction hydraulic cylinder 52 to the tank 90, and a control unit 11 that causes the extension/contraction cylinder pressure relief solenoid valve 88 to connect one hydraulic cylinder to a tank 90 and releases a pressure in the one hydraulic cylinder when the other hydraulic cylinder of the first extension/contraction hydraulic cylinder 51 and the second extension/contraction hydraulic cylinder 52 is contracted or extended in a state where the one hydraulic cylinder of the first extension/contraction hydraulic cylinder 51 and the second extension/contraction hydraulic cylinder 52 is contracted. Hereinafter, a specific configuration of the crane 1 according to the present embodiment will be described.

[Configuration of Crane]

As illustrated in FIG. 1, a crane 1 includes a vehicle 2 and a crane device 3. The vehicle 2 includes a pair of left and right front wheels 21 and a pair of left and right rear wheels 22. In addition, the vehicle 2 includes an, outrigger 23 that is brought into contact with the ground to achieve stability when carrying a load W. In the vehicle 2, the crane device 3 supported at the upper part of the vehicle 2 is turnable by an actuator.

The crane device 3 includes a boom 4 so as to protrude forward from a rear portion thereof. The boom 4 is configured to be turnable by a turning hydraulic motor (not illustrated). The boom 4 is configured to be telescoped by an extension/contraction hydraulic cylinder 5 (see FIGS. 2 to 5). The boom 4 is configured to be derrickable by a derricking hydraulic cylinder 31. The turning angle, the turning speed, the telescopic length, the telescopic speed, the derricking angle, and the derricking speed of the boom 4 are detected by a plurality of sensors (not illustrated).

A wire rope 61 is stretched around the boom 4. A winch 62 around which the wire rope 61 is wound is disposed at the proximal end of the boom 4, and a hook 63 is suspended by the wire rope 61 at the distal end of the boom 4. The winch 62 is formed integrally with a winding hydraulic motor (not illustrated), and can wind in and out the wire rope 61. The hook 63 is configured to be movable up and down by a winding hydraulic motor. The lifting length and the lifting speed of the hook 63 are detected by a sensor (not illustrated).

The crane device 3 includes a cabin 32 on the side of the boom. 4. Inside the cabin 32, a turning operation tool, a telescopic operation tool, a derricking operation tool, a winding operation tool, and the like for operating the crane device 3 are provided.

[Boom]

FIGS. 2 to 5 are side views of the boom 4. The boom 4 is configured by assembling five members from a first boom 41 to a fifth boom in a nested manner. The first, boom. 41 is an outermost member disposed on the proximal end side, and is supported to be turnable and derrickably. The second boom 42 is a member that is disposed inside a first boom 41 and telescopes with respect to the first boom 41.

The third boom 43 is a member that is disposed inside the second boom 42 and telescopes with respect to the second boom 42. The fourth boom 44 is disposed inside the third boom 43 and is a member that telescopes with respect to the third boom 43. The fifth boom 45 is an innermost, member disposed on the distal end side, disposed inside the fourth boom 44, and telescopes with respect to the fourth boom 44. The third boom 43, the fourth boom 44, and the fifth boom 45 are connected via a wire (not illustrated) or the like, and each of the booms 43, 44, and 45 is configured to telescope in conjunction at a constant rate. That is, in the third boom 43, the fourth boom 44, and the fifth boom 45 are in a fully contracted state at a time, and in a fully extended state at a time.

[Extension/Contraction Hydraulic Cylinder]

As shown in FIGS. 2 to 5, the extension/contraction hydraulic cylinder 5 is disposed inside the boom 4. The extension/contraction hydraulic cylinder 5 includes the first extension/contraction, hydraulic cylinder 51 that telescopes the second boom 42, and the second extension/contraction hydraulic cylinder 52 that telescopes the third boom 43. As described above, since the third boom 43, the fourth boom 44, and the fifth boom 45 are connected, the fourth boom 44 and the fifth boom 45 also telescope in conjunction with extension and contraction of the third boom 43 due to extension and contraction of the second extension/contraction hydraulic cylinder 52. Therefore, it can be said that the second extension/contraction hydraulic cylinder 52 telescopes the third boom 43, the fourth boom 44, and the fifth boom 45. The first extension/contraction hydraulic cylinder 51 corresponds to an example of one cylinder of the first hydraulic cylinder and the second hydraulic cylinder. The second extension/contraction hydraulic cylinder 52 corresponds to an example of the other cylinder of the first hydraulic cylinder and the second hydraulic cylinder. Specifically, when the first extension/contraction hydraulic cylinder 51 corresponds to an example of the first hydraulic cylinder, the second extension/contraction hydraulic cylinder 52 corresponds to an example of the second hydraulic cylinder. When the first extension/contraction hydraulic cylinder 51 corresponds to an example of the second hydraulic cylinder, the second extension/contraction hydraulic cylinder 52 corresponds to an example of the first hydraulic cylinder.

[Boom Length Detector]

As illustrated in FIGS. 2 to 5, boom length detector 7 that detects the length of the boom is provided on the outer face of boom 4. The boom length detector 7 includes a reel 71, a wire 72 having one end fixed to the reel 71 and the other end fixed, to the distal end of the fifth boom and a sensor (not illustrated) that detects a feeding amount of the wise 72. The sensor is connected to the control unit 11 described later. Thus, the length of boom. 4 can be detected by detecting the wire feeding amount with the sensor.

[Configuration of Hydraulic Circuit Related to Extension/Contraction Hydraulic Cylinder]

Figure 6:
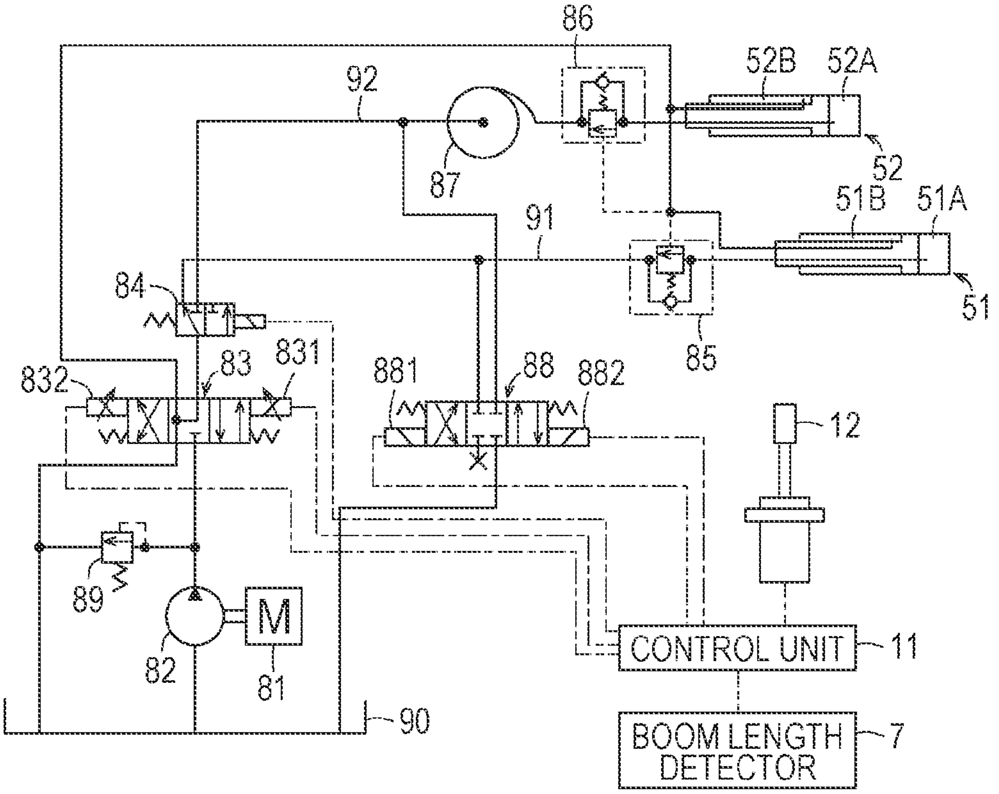
FIG. 6 is a diagram illustrating a hydraulic circuit.

FIG. 6 is a diagram illustrating a hydraulic circuit related to the first extension/contraction hydraulic cylinder 51 and the second extension/contraction hydraulic cylinder 52. The hydraulic circuit includes the first extension/contraction hydraulic cylinder 51, the second extension/contraction hydraulic cylinder 52, a prime motor 81, a pump 82, an extension/contraction control valve 83, an extension/contraction cylinder operation switching solenoid valve 84, a first counter balance valve 85, a second counter balance valve 86, a hose reel 87, the extension/contraction cylinder pressure relief solenoid valve 88, a relief valve 89, and the tank 90.

The prime motor 81 is connected to the pump 82. The pump 82 corresponds to an example of a supply unit, is disposed between the tank 90 and the extension/contraction control valve 83, and pressure-feeds hydraulic oil from the tank 90 to the extension/contraction control valve 83.

The extension/contraction control valve 83 is disposed between the pump 82 and the extension/contraction cylinder operation switching solenoid valve 84. The extension/contraction control valve 83 is a four-way, four-port, three-position electromagnetic valve. The four ports are connected to the pump 82, the tank 90, the extension/contraction cylinder operation switching solenoid valve 84, a contraction circuit 51B of the first extension/contraction hydraulic cylinder 51 and a contraction circuit 525 of the second extension/contraction hydraulic cylinder 52, respectively.

The extension/contraction control valve 83 includes a first solenoid 831 and a second solenoid 832, and is configured to be switchable between a first position, a second position, and a third position by the first solenoid 831 and the second solenoid 832. Specifically, when the first solenoid 831 is turned on, and the second solenoid 832 is turned off, the extension/contraction control valve 83 is switched to the first position, and when the first solenoid 831 turned off, and the second solenoid 832 is turned on, the extension/contraction control valve 83 is switched to the second position, and when both the first solenoid 831 and the second solenoid 832 are turned off, the extension/contraction control valve 83 is switched to the third position.

In a state where the extension/contraction control valve 83 is switched co the third position, the port leading to the pump 82 is closed and the other three ports lead to the tank 90. In a state where the extension/contraction control valve 83 is switched to the first position, the pump 82 and the extension/contraction cylinder operation switching solenoid valve 84 are connected, and the contraction circuit 51B of the first extension/contraction hydraulic cylinder 51, the contraction circuit 52B of the second extension/contraction hydraulic cylinder 52, and the tank 90 are connected. In a state where the extension/contraction control valve 83 is switched to the first position, the hydraulic oil is supplied from the pump 82 to the extension/contraction cylinder operation switching solenoid valve 84.

In a state where the extension/contraction control valve 83 is switched to the second position, the pump 82, the contraction circuit 51B of the first extension/contraction hydraulic cylinder 51, and the contraction circuit 52B of the second extension/contraction hydraulic cylinder 52 are connected, and the extension/contraction cylinder operation switching solenoid valve 84 and the tank 90 are connected. In a state where the extension/contraction control valve 83 is switched to the second position, hydraulic oil is supplied from the pump 82 to the contraction circuit 51B of the first extension/contraction hydraulic cylinder 51 and the contraction circuit 52B of the second extension/contraction hydraulic cylinder 52.

The extension/contraction cylinder operation switching solenoid valve 84 is disposed between the extension/contraction control valve 83, the first counter balance valve 85, and the hose reel 87. The extension/contraction cylinder operation switching solenoid valve 84 is a 3-port single-acting electromagnetic valve, and is at the left side position when turned off, and is switched to the right side position when turned on. The three ports are connected to the extension/contraction control valve 83, the first counter balance valve 85, and the hose reel 87, respectively.

When the solenoid is turned off, the extension/contraction cylinder operation switching solenoid valve 84 connects the extension/contraction control valve 83 and the first counter balance valve 85 and closes the port connected to the hose reel 87. When the solenoid is turned on, the extension/contraction cylinder operation switching solenoid valve 84 connects the extension/contraction control valve 83 and the hose reel 87, and closes the port connected to the first counter balance valve 85.

The first counter balance valve 65 is disposed between the extension/contraction cylinder operation switching solenoid valve 84 and an extension circuit 51A of the first extension/contraction hydraulic cylinder 51. The second counter balance valve 86 is disposed between the hose reel 87 and an extension circuit 52A of the second extension/contraction hydraulic cylinder 52. The hose reel 87 is disposed between the extension/contraction cylinder operation switching solenoid valve 84 and the second counter balance valve 86.

The extension/contraction cylinder pressure relief solenoid valve 88 corresponds to an example of a switching valve, and is disposed between a circuit 91 connecting the first counter balance valve 85 and the extension/contraction cylinder operation switching solenoid valve 84 and the tank 90 and between a circuit. 92 connecting the hose reel 87 and the extension/contraction cylinder operation switching solenoid valve 84 and the tank 90. The extension/contraction cylinder pressure relief solenoid valve 88 is a four-direction, four-port, three-position electromagnetic valve, and includes a first extension/contraction cylinder pressure relief solenoid 881 on the left side and a second extension/contraction cylinder pressure relief solenoid 882 on the right side. The four ports are connected to the tank 90, the circuit 91, the circuit 92 and the closed circuit, respectively. Note that a circuit including the circuits 91 and 92 and connecting the first extension/contraction hydraulic cylinder 51, the second extension/contraction, hydraulic cylinder 52, and the pump 82 corresponds to an example of a supply circuit.

The extension/contraction cylinder pressure relief solenoid valve 88 is configured to be switchable between the first position, the second position, and the third position by the first extension/contraction cylinder pressure relief solenoid 881 and the second extension/contraction cylinder pressure relief solenoid 882. Specifically, when the first extension/contraction cylinder pressure relief solenoid 881 is turned on and the second extension/contraction cylinder pressure relief solenoid 882 is turned off, the extension/contraction cylinder pressure relief solenoid valve 88 is switched to the first positon. When the first extension/contraction cylinder pressure relief solenoid 881 is turned off and the second extension/contraction cylinder pressure relief solenoid 882 is turned on, the extension/contraction cylinder pressure relief solenoid valve 88 is switched to the second position. When both the first extension/contraction cylinder pressure relief solenoid 881 and the second extension/contraction cylinder pressure relief solenoid 882 are turned off, the extension/contraction cylinder pressure relief solenoid valve 88 is switched to the third position.

In a state where the extension/contraction cylinder Pressure relief solenoid valve 88 is switched to the third position, the four ports are closed, and the first circuit that does not connect the extension circuit 51A of the first extension/contraction hydraulic cylinder 51 and the extension circuit 52A of the second extension/contraction hydraulic cylinder 52 to the tank 90 is formed. That is, the first circuit includes the extension/contraction cylinder pressure relief solenoid valve 88 at the third position, a circuit that connects the extension circuit 51A of the first, extension/contraction hydraulic cylinder 51 and the extension/contraction cylinder pressure relief solenoid valve 88, and a circuit that connects the extension circuit 52A of the second extension/contraction hydraulic cylinder 52 and the extension/contraction cylinder pressure relief solenoid valve 88.

In a state where the extension/contraction cylinder pressure relief solenoid valve 88 is switched to the first position, the circuit 91 and the tank 90 are connected, and the circuit 92 is connected to a closed circuit. That is, in a state in which the extension/contraction cylinder pressure relief solenoid valve 88 is switched to the first position, the second circuit that connects the extension circuit 51A of the first extension/contraction hydraulic cylinder 51 to the tank 90, and does not connect the extension circuit 52A of the second extension/contraction hydraulic cylinder 52 to the tank 90 is formed. That is, the second circuit includes the extension/contraction cylinder pressure relief solenoid valve 88 at the first position, a circuit that connects the extension circuit 51A of the first extension/contraction hydraulic cylinder 51 and the tank 90, a circuit that connects the extension circuit 52A of the second extension/contraction hydraulic cylinder 52 and the extension/contraction cylinder pressure relief solenoid valve 88, and a closed circuit.

In a state where the extension/contraction cylinder pressure relief solenoid valve 88 is switched to the second position, the circuit 92 and the tank 90 are connected, and the circuit 91 connected to a closed, circuit. That is, in a state in which the extension/contraction cylinder pressure relief solenoid valve 88 is switched to the second position, the third circuit that does not connect the extension circuit 51A of the first extension/contraction hydraulic cylinder 51 to the tank 90 and connects the extension circuit 52A of the second extension/contraction hydraulic cylinder 52 to the tank 90 is formed. That is, the third circuit includes the extension/contraction cylinder pressure relief solenoid valve 88 at the second position, a circuit that connects the extension circuit 52A of the second extension/contraction, hydraulic cylinder 52 and the tank 90, a circuit that connects the extension circuit 51A of the first extension/contraction, hydraulic cylinder 51 and the extension/contraction cylinder pressure relief solenoid valve 88, and a closed circuit.

As described above, the extension/contraction cylinder pressure relief solenoid valve 88 is an electromagnetic valve that switches between the first circuit, the second circuit, and the third circuit. It can be said that the first circuit, the second circuit, and the third circuit constitute a pressure relief circuit.

The relief valve 89 is disposed between the delivery side of the pump 82 and the tank 90, and is a valve that returns surplus hydraulic oil delivered from the pump 82 to the tank 90. The tank 90 stores hydraulic oil used in a hydraulic circuit.

In addition, the first solenoid 831 and the second solenoid 832 of the extension/contraction control valve 83, the solenoid of the extension/contraction cylinder operation, switching solenoid valve 84, and the first extension/contraction cylinder pressure relief solenoid 881 and the second extension/contraction cylinder pressure relief solenoid 882 of the extension/contraction cylinder pressure relief solenoid valve 88 are connected to the control unit 11.

The boom length detector 7 and an extension/contraction operation lever 12 are also connected to the control unit 11. The extension/contraction operation lever 12 operates extension/contraction of the first extension/contraction hydraulic cylinder 51 and the second extension/contraction hydraulic cylinder 52 according to the operation direction (extension direction and contraction direction) and the operation amount of the lever.

The control unit 11 includes a control device such as a CPU and a storage device such as a random access memory (RAM) and a read only memory (ROM). The control unit 11 controls the extension/contraction control valve 83, the extension/contraction cylinder operation, switching solenoid valve 84, and the extension/contraction cylinder pressure relief solenoid valve 88 according to inputs from the boom length detector 7 and the extension/contraction operation lever 12.

[Basic Operation of Hydraulic Circuit]

According to the hydraulic circuit of FIG. 6, a current flows in the first solenoid 831 or the second solenoid 832 according to the operation direction and the operation amount of the extension/contraction operation lever 12, and the extension/contraction control valve 83 moves according to the amount of the current. The hydraulic oil delivered from the pump 82 driven by the prime motor 81 flows into the first extension/contraction hydraulic cylinder 51 or the second extension/contraction hydraulic cylinder 52 according to the amount of movement of the extension/contraction control valve 83. As a result, the first extension/contraction hydraulic cylinder 51 or the second extension/contraction hydraulic cylinder 52 extends/contracts. The surplus hydraulic oil is discharged from the relief valve 89 to the tank 90.

At this time, when the first extension/contraction hydraulic Cylinder 51 is operated, the extension/contraction cylinder operation switching solenoid valve 84 is turned off (state in which the extension/contraction control valve 83 and the first extension/contraction hydraulic cylinder 51 are connected). On the other hand, when the second extension/contraction hydraulic cylinder 52 is operated, the extension/contraction cylinder operation switching solenoid valve 84 is turned on (a state in which the extension/contraction control valve 83 and the second extension/contraction hydraulic cylinder 52 are connected). That is, the extension/contraction control valve 83 controls the operation direction and the operation speed of the first extension/contraction hydraulic cylinder 51 or the second extension/contraction hydraulic cylinder 52, and the extension/contraction cylinder operation switching solenoid valve 84 switches between the first extension/contraction hydraulic cylinder 51 or the second extension/contraction hydraulic cylinder 52 to be operated.

[Extension/Contraction Mode]

The control unit 11 can execute a plurality of extension/contraction modes having different extension/contraction orders of the first extension/contraction hydraulic cylinder 51 and the second extension/contraction hydraulic cylinder 52, and controls the extension/contraction control valve 83, the extension/contraction cylinder operation switching solenoid valve 84, and the extension/contraction cylinder pressure relief solenoid valve 88 in each extension/contraction mode. In the present embodiment, the plurality of extension/contraction modes are the first extension/contraction mode and the second extension/contraction mode. The first extension/contraction mode and the second extension/contraction mode can be selected (can be set) by operating an operation unit (not illustrated), and can be selected and operated in either the fully contracted state or the fully extended state of the boom 4. In other states, the last selected extension/contraction, mode is held.

(First Extension/Contraction Mode)

The first extension/contraction mode is a mode for performing control so as to be able to obtain a first state (state illustrated in FIG. 2) in which the first extension/contraction hydraulic cylinder 51 and the second, extension/contraction hydraulic cylinder 52 are fully contracted, a second state (state illustrated in FIG. 3) in which the first extension/contraction hydraulic cylinder 51 is fully extended and the second extension/contraction hydraulic cylinder 52 is fully contracted, and a third state (state illustrated in FIG. 4) in which the first extension/contraction hydraulic cylinder 51 and the second extension/contraction hydraulic cylinder 52 are fully extended.

That is, the first extension/contraction mode is a mode that transitions between the first state and the second, state by the first extension/contraction hydraulic cylinder 51 extending and contracting, and that transitions between the second state and the third state by the second extension/contraction hydraulic cylinder 52 extending and contracting.

Table 1 is a table illustrating a state of each solenoid in the first extension/contraction mode.

TABLE 1

| State in first extension/contraction mode | Extension/contraction cylinder operation switching solenoid valve | First extension/contraction cylinder pressure relief solenoid | Second extension/contraction cylinder pressure relief solenoid |
|---|---|---|---|
| First state <=> second state | Off | Off | On |
| Second state <=> third state | On | Off | Off |

As shown in Table 1, when transitioning between the first state and the second state, the control unit 11 causes the extension/contraction cylinder operation switching solenoid valve 84 to be turned off, the first extension/contraction cylinder pressure relief solenoid 881 to be turned off, and the second extension/contraction cylinder pressure relief solenoid 882 to be turned on. When transitioning between the second state and the third state, the control unit 11 causes the extension/contraction cylinder operation switching solenoid valve 84 to be turned on, the first extension/contraction cylinder pressure relief solenoid 861 to be turned off, and the second extension/contraction cylinder pressure relief solenoid 882 to be turned off.

Here, the control unit 11 determines the first state, the second state, and the third state from the detection result (detection value) of the boom length detector 7. However, the length of the boom 4 detected by the boom length detector 7 has a certain range due to variation and hysteresis of the boom length detector 7. Therefore, within this range, the second extension/contraction hydraulic cylinder 52 at the time of transitioning from the third state to the second state may not be completely fully contracted.

In this regard, a process of reducing the boom 4 from the fully extended state to the fully contracted state in the first extension/contraction mode will be described as an example. When the boom 4 is in the fully extended state, the first extension/contraction hydraulic cylinder 51 and the second extension/contraction hydraulic cylinder 52 are in the third state of being fully extended. When the second extension/contraction hydraulic cylinder 52 is reduced from this state, the length of the boom 4 detected by the boom length detector 7 is reduced, and it is determined that the second state is reached, the second extension/contraction hydraulic cylinder 52 may not be completely fully contracted.

When it is determined that the second state is reached, the extension/contraction cylinder operation switching solenoid valve 84 is switched off, the first extension/contraction hydraulic cylinder 51 starts to contract, the second extension/contraction cylinder pressure relief solenoid 882 is turned on, and the extension circuit 52A of the second extension/contraction hydraulic cylinder 52 is connected to the tank 90. Therefore, when the first extension/contraction hydraulic cylinder 51 contracts, the second extension/contraction hydraulic cylinder 52 also contracts at the same time. As a result, there is no stroke (amount of extension) remaining in the second extension/contraction hydraulic cylinder 52, and the second extension/contraction, hydraulic cylinder 52 is completely contracted.

In addition, it is conceivable that, in the process of extending the boom 4, the hydraulic oil leaks to the extension/contraction hydraulic cylinder not to be operated via the spool gap of the extension/contraction cylinder operation switching solenoid valve 84, and the extension/contraction hydraulic cylinder not to be operated extends.

In this regard, a process of extending the boom 4 from the fully contracted state to the fully extended state in the first extension/contraction mode will be described as an example. When the boom 4 is in the fully contracted state, the first extension/contraction hydraulic cylinder 51 and the second extension/contraction hydraulic cylinder 52 are in the first state of being fully contracted. While the first extension/contraction hydraulic cylinder 51 extends from this state to the second state, a high Pressure acts on the extension circuit 51A of the first extension/contraction hydraulic cylinder 51 in order to move the cylinder.

At this time, since the second extension/contraction, hydraulic cylinder 52 is not operating and only low pressure is applied, the hydraulic oil may leak toward the extension circuit 52A of the second extension/contraction hydraulic cylinder 52 via the spool gap of the extension/contraction cylinder operation switching solenoid, valve 84 due to the pressure difference.

However, since the second extension/contraction cylinder pressure relief solenoid 882 is turned on and the extension circuit 52A of the second extension/contraction hydraulic cylinder 52 is connected to the tank 90, the leaked hydraulic oil return to the tank 90 through the second extension/contraction cylinder pressure relief solenoid 882 before reaching the extension circuit 52A of the second extension/contraction hydraulic cylinder 52. As a result, the second extension/contraction hydraulic cylinder 52 does not extend and can maintain a completely fully contracted state.

As described above, the control unit 11 controls each solenoid such that the pressure relief circuit is the third circuit when the first extension/contraction mode transitions between the first state and the second state. As a result, when the first extension/contraction mode transitions between the first state and the second state, the second extension/contraction hydraulic cylinder 52 can be completely fully contracted.

(Second Extension/Contraction Mode)

The second extension/contraction, mode is a mode for performing control so as to be able to obtain a first state (state illustrated in FIG. 2) in which the first extension/contraction hydraulic cylinder 51 and the second extension/contraction hydraulic cylinder 52 are fully contracted, a fourth state (state illustrated in FIG. 5) in which the first extension/contraction hydraulic cylinder 51 is fully contracted and the second extension/contraction hydraulic cylinder 52 is fully extended, and a third state (state illustrated in FIG. 4) in which the first extension/contraction hydraulic cylinder 51 and the second extension/contraction hydraulic cylinder 52 are fully extended.

That is, the second extension/contraction mode is a mode that transitions between the first state and the fourth state by the second extension/contraction hydraulic cylinder 52 extending and contracting, and that transitions between the fourth state and the third state by the first extension/contraction hydraulic cylinder 51 extending and contracting.

Table 2 is a table illustrating a state of each solenoid in the second extension/contraction mode.

TABLE 2

| State in second extension/contraction mode | Extension/contraction cylinder operation switching solenoid valve | First extension/contraction cylinder pressure relief solenoid | Second extension/contraction cylinder pressure relief solenoid |
|---|---|---|---|
| First state <=> fourth state | On | On | Off |
| Fourth state <=> third state | Off | Off | Off |

As shown in Table 2, when transitioning between the first state and the fourth state, the control unit 11 causes the extension/contraction cylinder operation switching solenoid valve 84 to be turned on, the first extension/contraction cylinder pressure relief solenoid 881 to be turned on, and the second extension/contraction cylinder pressure relief solenoid 882 to be turned off. When transitioning between the fourth state and the third state, the control unit 11 causes the extension/contraction cylinder operation switching solenoid valve 84 to be turned, off, the first extension/contraction cylinder pressure relief solenoid 881 to be turned off, and the second extension/contraction cylinder pressure relief solenoid 882 to be turned off.

As in the first extension/contraction mode, the control unit 11 determines the first state, the third state, and the fourth state from the detection result of boom length detector 7. Therefore, for the same reason as in the first extension/contraction mode, the first extension/contraction hydraulic cylinder 51 at the time of transition from the third state to the fourth state may not be completely fully contracted.

In this regard, a process of reducing the boom 4 from the fully extended, state to the fully contracted state in the second extension/contraction mode will be described as an example. When the boom 4 is in the fully extended state, the first extension/contraction hydraulic cylinder 51 and the second extension/contraction hydraulic cylinder 52 are in, the third state of being fully extended. When the first extension/contraction hydraulic cylinder 51 contracts from this state, the length of the boom 4 detected by the boom length, detector 7 is she and it is determined that the fourth state is reached, the first extension/contraction hydraulic cylinder 51 may not be completely fully contracted.

When it is determined that the fourth state is reached, the extension/contraction cylinder operation switching solenoid valve 84 is switched on, the second extension/contraction hydraulic cylinder 52 starts to contract, the first extension/contraction cylinder pressure relief solenoid 881 is turned on, and the extension circuit 51A of the first extension/contraction hydraulic cylinder 51 is connected to the tank 90. Therefore, when the second extension/contraction hydraulic cylinder 52 contracts, the first extension/contraction hydraulic cylinder 51 also contracts at the same time. As a result, there is no stroke (amount of extension) remaining in the first extension/contraction hydraulic cylinder 51, and the first extension/contraction hydraulic cylinder 51 is completely fully contracted.

As in the first extension/contraction mode, it is conceivable that the hydraulic oil leaks to the extension/contraction hydraulic cylinder not to be operated through the spool gap of the extension/contraction cylinder operation switching solenoid valve 84 in the extension, process of the boom 4, and the extension/contraction hydraulic cylinder not to be operated extends.

In this regard, a process of extending the boom 4 from the fully contracted state to the fully extended state in the second extension/contraction mode will be described as an example. When the boom 4 in the fully contracted state, the first extension/contraction hydraulic cylinder 51 and the second extension/contraction hydraulic cylinder 52 are in the first state of being fully contracted. Until the second extension/contraction hydraulic cylinder 52 extends from this state to the fourth state, a high pressure acts on the extension circuit 52A of the second extension/contraction hydraulic cylinder 52 in order to move the cylinder.

At this time, since the first extension/contraction, hydraulic cylinder 51 is not operating and only low pressure is applied, the hydraulic oil may leak toward the extension, circuit 51A of the first extension/contraction hydraulic cylinder 51 via the spool gap of the extension/contraction cylinder operation switching solenoid valve 84 due to the pressure difference.

However, since the first extension/contraction cylinder pressure relief solenoid 881 is turned on and the extension circuit 51A of the first extension/contraction hydraulic cylinder 51 is connected to the tank 90, the leaked hydraulic oil return to the tank 90 through the first extension/contraction cylinder pressure relief solenoid 881 before reaching the extension circuit 51A of the first extension/contraction hydraulic cylinder 51. As a result, the first extension/contraction hydraulic cylinder 51 does not extend and, can, maintain a completely fully contracted state.

As described above, when the second extension/contraction mode transitions between the first state and the fourth state, the control unit 11 controls each solenoid such that the extension/contraction cylinder pressure relief solenoid valve 88, which is a pressure relief circuit, is the second circuit. As a result, when the second extension/contraction mode transitions between the first state and the fourth state, the first extension/contraction hydraulic cylinder 51 can be completely fully contracted.

According to the crane 1 of the above embodiment, during extension and contraction of one of the first extension/contraction hydraulic cylinder 51 and the second extension/contraction hydraulic cylinder 52, the other is connected to the tank 90 through the pressure relief circuit, so that the pressure of the other extension circuit is released, and the other can be fully contracted. As a result, when the lifting load is suspended in a state where the other extension/contraction hydraulic cylinder is completely fully contracted, the load of the lifting load can be received by the cross section of the boom 4 without being received by the other extension/contraction hydraulic cylinder, so that damage to the other extension/contraction hydraulic cylinder can be suppressed.

When the number of stages of the booms increases and the number of extension/contraction cylinders increases accordingly, the extension/contraction cylinder operation switching solenoid valve 84 and the extension/contraction cylinder pressure relief solenoid valve 88 are increased according to the number of extension/contraction cylinders and similarly controlled, so that similar actions and effects can be obtained.

INDUSTRIAL APPLICABILITY

The present invention can be applied to various work machines having a telescopic boom.

REFERENCE SIGNS LIST

1 crane
11 control unit
2 vehicle
21 front wheel
22 rear wheel
23 outrigger
3 crane device
31 derricking hydraulic cylinder
32 cabin
4 boom
41 first boom
42 second boom
43 third boom
44 fourth boom
45 fifth boom
5 extension/contraction hydraulic cylinder
51 first extension/contraction hydraulic cylinder
51B contraction circuit
52 second extension/contraction hydraulic cylinder
52B contraction circuit
61 wire rope
62 winch
63 hook
7 boom length detector
71 reel
72 wire
81 prime motor
82 pump
83 extension/contraction control valve
831 first solenoid
632 second solenoid
84 extension/contraction cylinder operation switching solenoid valve
85 first counter balance valve
86 second counter balance valve
87 hose reel
88 extension/contraction cylinder pressure relief solenoid valve (electromagnetic valve)
881 first extension/contraction cylinder pressure relief solenoid
882 second extension/contraction cylinder pressure relief solenoid
89 relief valve
90 tank
91, 92 circuit
W lifting load

The invention claimed is:

1. A work machine comprising:

a first hydraulic cylinder and a second hydraulic cylinder that telescope a telescopic boom on a basis of hydraulic oil supply and discharge;

a switching valve that is disposed on a pressure relief circuit for connecting the first hydraulic cylinder and the second hydraulic cylinder to a tank; and a control unit that selectively operates either the first hydraulic cylinder or the second hydraulic cylinder, and causes the switching valve to connect the first hydraulic cylinder to the tank and releases a pressure in the first hydraulic cylinder when contracting or extending the second hydraulic cylinder in a condition in which the first hydraulic cylinder contracts.

2. The work machine according to claim 1, further comprising:

a supply unit that supplies the hydraulic oil to the first hydraulic cylinder and the second hydraulic cylinder, wherein the pressure relief circuit is connected to a supply circuit that connects the first hydraulic cylinder, the second hydraulic cylinder, and the supply unit.

3. The work machine according to claim 1, wherein each of the first hydraulic cylinder and the second hydraulic cylinder includes an extension circuit to which the hydraulic oil is supplied when extending and a contraction circuit to which the hydraulic oil is supplied when contracting, and wherein the pressure relief circuit is connected to the extension circuit.

4. The work machine according to claim 1, further comprising:

a boom length detector that detects a length of the telescopic boom, wherein the control unit controls the switching valve according to a detection value of the boom length detector.

5. The work machine according to claim 1, wherein under control of the control unit, the switching valve switches between a first circuit that does not connect the first hydraulic cylinder and the second hydraulic cylinder to the tank, a second circuit that connects the first hydraulic cylinder to the tank and does not connect the second hydraulic cylinder to the tank, and a third circuit that does not connect the first hydraulic cylinder to the tank and connects the second hydraulic cylinder to the tank.

6. The work machine according to claim 1, wherein the control unit is capable of executing a plurality of extension/contraction modes set in advance and having different extension/contraction orders of the first hydraulic cylinder and the second hydraulic cylinder, and controls the switching valve in each of the extension/contraction modes.

7. The work machine according to claim 6, wherein the plurality of extension/contraction modes include a first extension/contraction mode having a first state in which the first hydraulic cylinder and the second hydraulic cylinder are fully contracted, a second state in which the first hydraulic cylinder is fully extended and the second hydraulic cylinder is fully contracted, and a third state in which the first hydraulic cylinder and the second hydraulic cylinder are fully extended, and wherein when the first extension/contraction mode transitions between the first state and the second state, the control unit causes the switching valve to connect the second hydraulic cylinder and the tank and releases a pressure in the second hydraulic cylinder.

8. The work machine according to claim 6, wherein the plurality of extension/contraction modes include a second extension/contraction mode having a first state in which the first hydraulic cylinder and the second hydraulic cylinder are fully contracted, a fourth state in which the first hydraulic cylinder is fully contracted and the second hydraulic cylinder is fully extended, and a third state in which the first hydraulic cylinder and the second hydraulic cylinder are fully extended, and wherein when the second extension/contraction mode transitions between the first state and the fourth state, the control unit causes the switching valve to connect the first hydraulic cylinder and the tank and releases the pressure in the first hydraulic cylinder.

* * * * *